Figure 1:
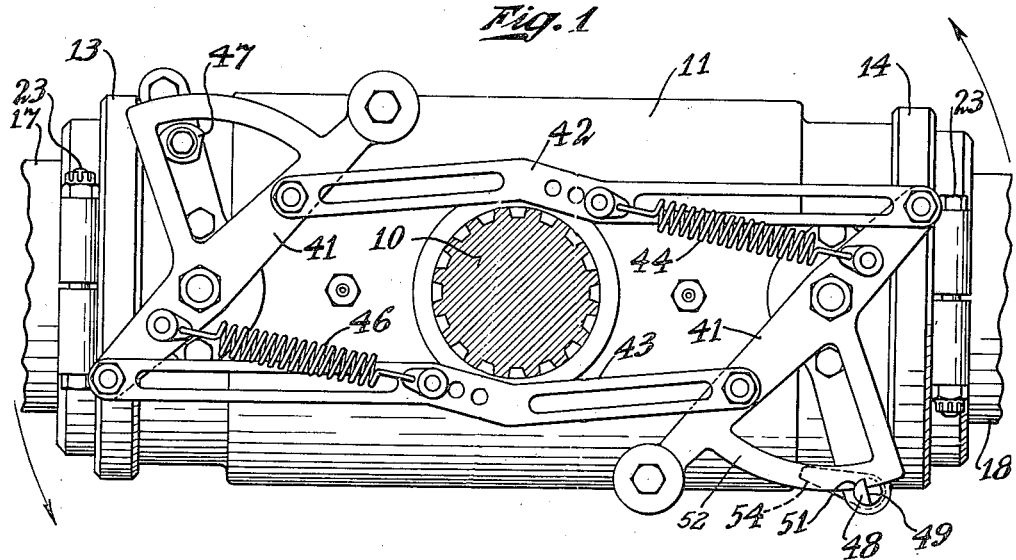

April 11, 1933.  J. P. LANDRUM  1,903,628
AIRPLANE PROPELLER
Original Filed May 16, 1930

INVENTOR
J. P. Landrum
BY
Johnston & Jennings
ATTORNEYS

Patented Apr. 11, 1933

1,903,628

UNITED STATES PATENT OFFICE

JOHN P. LANDRUM, OF BIRMINGHAM, ALABAMA, ASSIGNOR OF ONE-HALF TO PERRY R. McCORMACK, OF BIRMINGHAM, ALABAMA

AIRPLANE PROPELLER

Application filed May 16, 1930, Serial No. 452,956. Renewed May 20, 1932.

My invention relates to airplane propellers, more particularly to means for changing the pitch of propeller blades while the propeller is rotating, and has for its object the provision of a means of the character designated, which shall be simple and sturdy of design and reliable in operation.

A further object of my invention is to provide an airplane propeller that shall have a predetermined minimum pitch for taking off, or at times when the translational velocity of the propeller is low, and a predetermined maximum pitch for cruising or when the translational velocity of the propeller is relatively high, together with means under the ready control of the pilot for changing from the minimum to the maximum pitch at will.

A still further object of my invention is to provide an airplane propeller that shall have a predetermined minimum pitch and a predetermined maximum pitch, together with releasable means for holding the propeller at its minimum pitch, and means responsive to centrifugal force for changing the pitch from the minimum to the maximum upon release of the releasable means, while the propeller is rotating at a given speed which may be considerably below normal speed.

In the development of airplane design, it has been found that if a propeller be set with a pitch suitable to obtain the maximum efficiency during take off and climbing, when the translational velocity of the propeller is low, that such a pitch is entirely unsuited for flying level when the translational velocity is high. This, among other things, is due to the fact that the torque resistance of an airplane propeller with a given pitch decreases with its translational velocity. With an engine designed for maximum power at a given angular velocity with wide open throttle, a propeller pitch low enough to permit the engine to attain its most efficient angular velocity at take off and during climbing would have so low a torsional resistance when flying level at increased translational velocity that the engine would race beyond its most efficient angular velocity and not develop full power.

On the other hand, if an airplane propeller be given the proper pitch for developing full power at a given angular velocity when flying level with the translational velocity of the propeller relatively high, the torque resistance during take off would be so high that the most efficient angular velocity of the engine could not be attained and considerable power would be lost when most needed. It has accordingly been the practice heretofore to provide a compromise setting for airplane propellers which is neither ideal for taking off and climbing nor for level flying.

In attempting to solve this difficulty, means have heretofore been proposed for manual adjustment of the pitch of the propeller blades during flight and other means have been proposed for automatic adjustment thereof. In all such means, great difficulties have been encountered in providing a design capable of withstanding the extremely high centrifugal force developed in the propeller during flight, which with average propellers now in use, approximates twenty tons. Another difficulty encountered in the design of such apparatus is that of overcoming the friction obtained in the blade mounting due to the extremely high centrifugal forces attained, together with the ever present necessity in airplane design for providing low weight, reliability, freedom from wear, and operability at reasonable speeds, coupled with safety.

In accordance with my invention I provide a sturdy propeller blade mounting in which each of the blades is rotatable about its longitudinal axis through a limited arc. At one extreme of this arc the blades have a minimum pitch suitable particularly for taking off when the translational velocity of the propeller is low. At the other extreme the blades have a greater pitch suitable for cruising when the translational velocity is relatively high. Associated with each of the blades is a spring biased, weighted crank arm adapted, in response to centrifugal force, to change the pitch of the blade from minimum to maximum while the propeller is rotating at a given speed which is preferably considerably below normal speed.

When the propeller is not rotating or is rotating at a relatively low speed, the blades are returned by the springs to their minimum pitch positions. The spring biased weight arms are linked together to insure angular movement of the blades in unison. Associated with the spring biased weight arms is a latch which is manually operable while the propeller is rotating and which is adapted to engage and hold the weight arms with the blades in their minimum pitch position.

Figure 2:
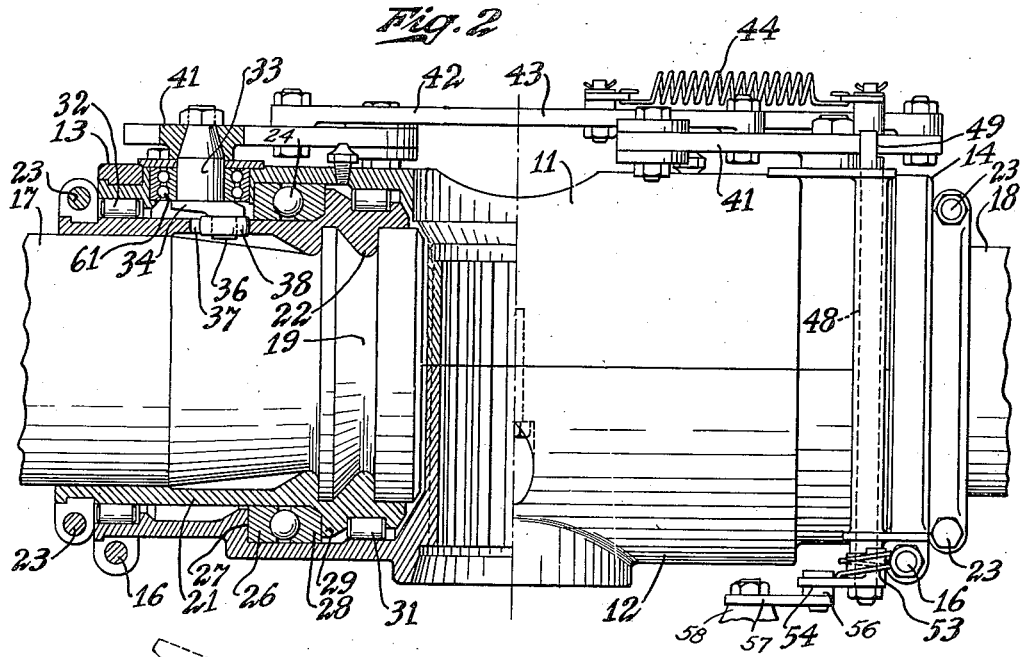
Figure 3:
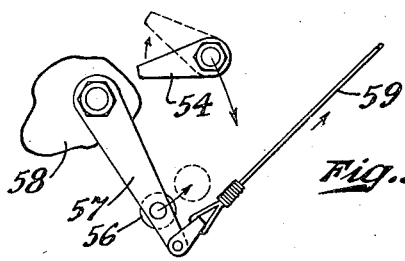

Other important features of my invention reside in the details of construction and arrangement of parts which are illustrated in the accompanying drawing forming a part of this application, in which Fig. 1 is an elevational view of a propeller mounting made in accordance with my invention;

Fig. 2 is a view half in section and half in elevation, taken at right angles to Fig. 1; and Fig. 3 is a fragmentary view showing the operation of the releasable latch means.

Referring to the drawing for a better understanding of my invention, I show in Figs. 1 and 2 a propeller shaft 10, upon which is splined a housing comprising halves 11 and 12 held together by rings 13 and 14. The rings 13 and 14 are slipped over the outer ends of the housings and clamped tightly thereon as by means of bolts 16.

At 17 and 18 I show fragments of propeller blades, each having a conventional grooved root portion 19. Fitting around the root portion 19 at each of the blades is a divided sleeve 21 having a tongued portion 22 complementary to the blade root 19. The sleeves 21 are tightly clamped about the blades 17 and 18 by means of bolts 23.

Cooperating between the sleeve 21 and the housing, for each blade, is a ball thrust bearing assembly 24 having its outer race 26 bearing against a shoulder 27 of the housing and its inner race 28 bearing against a shoulder 29 of the sleeve. At the inner end of the sleeves 21 is a roller bearing assembly 31, and at the outer end a roller bearing assembly 32, which roller bearing assemblies cooperate with the housing to permit free angular movement of the blades about their longitudinal axes.

Mounted in the housing on each side of the propeller shaft 10 is a crank shaft 33 having a crank arm 34 extending inwardly of the housing and carrying a crank 36 on its inner end which protrudes into an elongated recess 37 formed in the side of the sleeve 21. Carried on the inner end of the crank 36 is a roller 38 which fits snugly in the recess, but which is free to turn transversely of the recess to compensate for movement of the crank arm. This is accomplished by making the outer periphery of the roller 38 spherical in shape and forming the walls of the recess in conformity to the shape of the roller. The roller 38 is also free to slide longitudinally on the crank 36 to permit angular movement of the crank.

Secured to the outer end of each of the crank shafts 33 is a weight arm 41, the two weight arms 41 being connected together by links 42 and 43, and being biased inwardly by means of springs 44 and 46. The springs 44 and 46 are relatively light, being only of sufficient strength to pull the weight arms into their inward positions in opposition to centrifugal force, when the propeller is rotating at a relatively slow speed. When the propeller is being rotated at any speed, say above 700 to 800 revolutions per minute, centrifugal force acting through the weight arms 41 is adapted to overcome the force exerted by the springs 44 and 46 and move the weight arms to their extreme outer positions.

It will be seen that as the weight arms move outwardly in response to centrifugal force, the crank shafts 33 are rotated, and the crank arms turn the sleeves 21 responsive to movement of the crank shafts, and change the pitch of the propeller blades. When the weight arms 41 are at their extreme inner positions, the pitch of the propeller blades is at a minimum; and when the weight arms 41 are in their extreme outer positions, the pitch is at its maximum. In order to limit the pitch to a predetermined minimum and maximum, I provide a stop means 47 which is carried by the housing and is adapted to engage with one of the weight arms 41 at both its inner and its outer positions.

In order that the weight arms 41 may be held at their inner positions with the propeller blades at their minimum pitch, I provide manually releasable latch means which will now be described. Mounted on the housing and extending transversely thereof is a bolt 48 having one side of the end thereof cut away at 49 to form a latch. When the bolt 48 is turned to the position shown in Fig. 1, with the weight arm 41 at its extreme inner position, the cut away portion of the bolt 48 drops into a complementary notch 51 formed in an arcuate arm 52 of the weight arm 41. In this position the weight arms are held against outward movement regardless of the speed of the propeller. The bolt 48 is surrounded at the other end by a coil spring 53 which is adapted to turn the bolt and force it into the notch 51 whenever the weight arms are at their extreme inner positions.

Mounted on the end of the bolt 48 opposite the cut away portion 49 is a finger 54 which, when engaged, is adapted to turn the bolt to release the latch and permit the weight arms to move outwardly responsive to centrifugal force. The finger 54 is adapted to be engaged by a roller 56 carried by a crank arm 57 mounted on a relatively stationary part of the engine or other suitable relatively stationary part, as shown at 58 in Fig. 3. The crank arm 57 is operable by means of a cable 59 secured to its outer end, and which may extend to any suitable part of the airplane, not shown, for manual operation.

From the foregoing description, the operation of my improved apparatus will be readily understood. The pitch of the propeller blades 17 and 18 is limited to a predetermined minimum, suitable for taking off when the translational velocity of the propeller is low. It is also limited to a predetermined maximum suitable for cruising and when the translational velocity of the propeller is high, the limiting means in both cases being accomplished by the stop 47 carried by the housing and engaging with one of the arms 41. When taking off, it is desirable that the pitch of the blades be held at a minimum until the translational velocity of the propeller has become sufficiently high. The bolt 48 with the latch means 49 in the notch 51 provides a means for holding the arm 41 against outward movement until it is desired that the pitch of the blades be changed to the maximum, which is suitable for cruising speed.

When it is desired to increase the pitch of the blades, the cable 59 is pulled by the pilot to bring the roller 56 into engagement with the finger 54 which turns the bolt 48 so that the cut out portion is disengaged from the notch 51, whereupon the cut out portion 49 rides on the arm 52 of the weight arm 41, and the weight arms 41 move to their extreme outward positions. When the angular velocity of the propeller is again decreased sufficiently, the springs 44 and 46 pull the weight arms 41 to their extreme inward positions, whereupon the spring 53 turns the bolt 48 to re-engage the cut out portion 49 with the notch 51 and again locks the weight arms in their inner positions.

The means provided for transmitting the turning movement of the crank arms 34 to the sleeves 21 is accomplished with a minimum of mechanism and a minimum of friction. The crank arms 33, as is shown, are mounted in the ball bearings 61, while the fit of the roller 38 in the elongated recess 37 insures that there shall be no binding of the crank arms relative to the sleeves, while at the same time the movement of the crank arm is positively transmitted to the sleeves.

From the foregoing it will be apparent that I have devised an improved mounting for airplane propellers which is rugged of design, simple of operation. and one in which the pitch of the propeller blade may be readily changed at will from a predetermined minimum to a predetermined maximum.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In an airplane propeller, a pair of propeller blades, a housing in which the blades are mounted, means movable responsive to angular velocity of the propeller for changing the pitch of the propeller blades from a predetermined minimum to a predetermined maximum, a positive latch means carried by the housing and adapted to hold said blades against movement in a predetermined position, and manually operable means for disengaging said latch means while the propeller is turning.

2. In an airplane propeller, a pair of propeller blades, mounting means for the blades, interconnected biased weight arms movable relative to a part of the mounting means operatively connected to the blades to vary their pitch in response to angular velocity from a predetermined minimum to a predetermined maximum, a positive latch means cooperating between the weight arms and their mounting means for holding the blades at a predetermined pitch position until released, and means for disengaging said latch means while the propeller is running.

3. In an airplane propeller, a propeller blade, mounting means for the blade, means included in the mounting means permitting a limited angular movement of the blade about its longitudinal axis to change its pitch from a predetermined minimum to a predetermined maximum, a positive latch carried on the mounting means for holding the blade at its minimum pitch, a latch arm carried by the latch, manually operable means located adjacent the mounting means and movable into the path of the latch arm for releasing the latch, means responsive to centrifugal force for turning the blade to its maximum pitch position when the latch is released, and stop means for holding the blade at its maximum pitch position.

4. In an airplane propeller, a pair of propeller blades, a propeller shaft, a housing for the blades mounted on the shaft, a sleeve secured to the inner end of each blade and rotatably mounted in the housing, thrust bearing means co-acting between the sleeves and the housing, a crank arm mounted in the housing for each of the sleeves and adapted to co-act with the sleeves to impart angular movement to the blades about their longitudinal axes to change the pitch thereof, spring biased weight arms mounted on the housing and movable responsive to centrifugal force in opposition to the springs for operating the crank arms, means to limit the movement of the crank arms to a predetermined maximum, a notch in one of the crank arms, a spring pressed latch fitting into the notch to hold said arm against movement responsive to centrifugal force, a trip finger on said latch, and a manually operable trip arm carried by a relatively stationary part and adapted to be moved into the path of said trip finger to release said latch.

5. In a propeller blade mounting, a propeller shaft, a propeller blade housing mounted on the shaft, a crank shaft mounted in the housing, a crank arm on the crank shaft and extending inwardly of the housing, a propeller blade, a sleeve fixedly secured to the blade root and rotatably mounted in the housing, said sleeve having an opening in the side thereof opposite the crank arm, crank means on the crank arm and fitting into the opening, and a spring biased weight arm on the outer end of the crank shaft to operate said crank arm responsive to centrifugal force.

6. In a propeller blade mounting, a propeller shaft, a propeller blade housing mounted on the shaft, a crank shaft mounted in the housing, a crank arm on the crank shaft and extending inwardly of the housing, a propeller blade, a sleeve fixedly secured to the blade root and rotatably mounted in the housing, said sleeve having an opening in the side thereof opposite the crank arm, crank means on the crank arm and fitting into the opening, a spring biased weight arm on the outer end of the crank shaft to operate said crank arm responsive to centrifugal force, means carried by the housing for limiting the arc of movement of the weight arm to a predetermined maximum, a latch on the housing adapted to interlock with the weight arm to hold said weight arm and the blade in a predetermined lesser pitch position, and manually operable trip means carried by a relatively stationary part and adapted to be moved into engagement with the latch to release it while the propeller is rotating.

7. In a propeller blade mounting, a propeller shaft, a propeller blade housing mounted on the shaft, a crank shaft mounted in the housing, a crank arm on the crank shaft and extending inwardly of the housing, a propeller blade, a sleeve fixedly secured to the blade root and rotatably mounted in the housing, said sleeve having an opening in the side thereof opposite the crank arm, crank means on the crank arm and fitting into the opening, a spring biased weight arm on the outer end of the crank shaft to operate said crank arm responsive to centrifugal force, means carried by the housing for limiting the arc of movement of the weight arm to a predetermined minimum and maximum, positive latch means to hold the weight arm at its inner limit of movement, and manually operable trip means for releasing said latch.

8. In an airplane propeller including a hub with blades mounted in the hub and turnable about their longitudinal axes in said hub, spring biased weight arms carried by the hub and operatively connected to each of the blades and movable in response to angular velocity of the propeller to turn said blades and vary the pitch thereof, a latch carried by the hub and engaging one of the weight arms to hold it and the blades in a predetermined lesser pitch position, manually operable means carried by a relatively stationary part and adapted to be moved into the path of the latch to engage and release it, and stop means carried by the hub to limit the movement of the weight arms and the blades to a predetermined maximum pitch position.

9. In a variable pitch propeller comprising a hub having a plurality of blades rotatably mounted therein for rotation about their longitudinal axes, a blade operating shaft rotatably mounted in the hub associated with the inner end of each blade, said shaft having a portion projecting laterally from the hub, a weighted member secured to each projecting portion and adapted to be moved under the action of centrifugal force during rotation of the propeller to effect rotation of said shaft and blade associated therewith in a direction to increase the pitch of said blade, and means for releasably latching the weighted members in such a position that the pitch of the blades will be a minimum.

10. A variable pitch propeller comprising a hub having a plurality of blades rotatably mounted therein, a sleeve secured to the inner end of each blade within the hub, a blade operating shaft having one end thereof operatively connected with said sleeve and the other end thereof projecting from said hub, said shaft being journaled in the hub, a weighted member secured to each of said shafts exteriorly of the hub and adapted to be moved in response to centrifugal force to automatically vary the pitch of the blades, and manually releasable latch means resiliently actuated in one direction for latching the weighted members in such position that the pitch of the blades will be a minimum.

11. A variable pitch propeller having a rotatable shaft, a hub drivably connected to said shaft, a plurality of propeller blades rotatably mounted in said hub, and means for automatically varying the pitch of said blades during operation of the propeller, said means comprising an operating shaft drivably connected with the inner ends of each of said propeller blades and rotatably mounted in the hub, a weighted member secured to each of said shafts exteriorly of the hub and movable in response to centrifugal force for varying the pitch of said blades, resilient means associated with said weighted members for yieldingly opposing movement of said weighted members in response to centrifugal force, means on said hub for positively limiting further movement of said weighted members after a predetermined maximum pitch of said blades has been attained, and manually releasable latch means for locking the weighted members in fixed position when the pitch of the blades is a minimum.

12. A variable pitch propeller having a rotatable shaft, a hub drivably connected with said shaft, a plurality of propeller blades rotatably mounted in said hub, and means for rotatably adjusting said blades for varying the pitch thereof during rotation of the shaft, said means comprising centrifugally-responsive members operatively connected with each of said blades, resilient means for yieldably opposing movement of said members in response to centrifugal force, and a latch mechanism for positively locking said members in such position that the pitch of the blades will be a minimum, said latch mechanism being manually releasable.

13. In a variable pitch propeller having a plurality of blades, means for automatically varying the pitch of said blades during operation of the propeller, and a self-adjusting releasable latch mechanism automatically operable at a predetermined speed of rotation of the propeller for preventing any further movemnt of said pitch varying means after the pitch of the blades has been reduced to a predetermined minimum.

14. In a variable pitch propeller having a hub and a plurality of blades rotatably mounted therein, means responsive to an operating condition of said propeller for varying the pitch of said blades during operation, and a releasable positively acting latch mechanism including a part carried by said hub and automatically operable when the speed of the propeller has obtained a predetermined value for positively preventing further movement of said pitch varying means after the pitch of the blades has been reduced to a predetermined minimum.

In testimony whereof I affix my signature.

JOHN P. LANDRUM.